US007955003B2

(12) United States Patent
Teo et al.

(10) Patent No.: US 7,955,003 B2
(45) Date of Patent: Jun. 7, 2011

(54) BAIL RELEASE MECHANISM FOR COMMUNICATIONS MODULE

(75) Inventors: Tat Ming Teo, Singapore (SG); Troy Wy Piew Chiang, Singapore (SG)

(73) Assignee: Finisar Corporation, Sunnyvale, CA (US)

( * ) Notice: Subject to any disclaimer, the term of this patent is extended or adjusted under 35 U.S.C. 154(b) by 112 days.

(21) Appl. No.: 12/478,499

(22) Filed: Jun. 4, 2009

(65) Prior Publication Data

US 2010/0142898 A1 Jun. 10, 2010

Related U.S. Application Data

(60) Provisional application No. 61/059,081, filed on Jun. 5, 2008.

(51) Int. Cl.
*G02B 6/36* (2006.01)

(52) U.S. Cl. ........................................... 385/92; 385/88

(58) Field of Classification Search .................... 385/88, 385/92, 53
See application file for complete search history.

(56) References Cited

U.S. PATENT DOCUMENTS

| | | | | |
|---|---|---|---|---|
| 6,439,918 | B1 * | 8/2002 | Togami et al. | 439/372 |
| 6,824,416 | B2 * | 11/2004 | Di Mascio | 439/352 |
| 6,943,854 | B2 | 9/2005 | Chiu et al. | |
| 7,255,495 | B2 * | 8/2007 | Yi et al. | 385/92 |
| 7,351,090 | B1 * | 4/2008 | Moore | 439/372 |
| 7,513,693 | B2 * | 4/2009 | Wang | 385/56 |
| 7,699,536 | B2 * | 4/2010 | Yoshikawa et al. | 385/92 |
| 2006/0245759 | A1 | 11/2006 | Kurashima et al. | |
| 2007/0123090 | A1 | 5/2007 | Kim et al. | |

* cited by examiner

*Primary Examiner* — Ryan Lepisto
*Assistant Examiner* — Eric Wong
(74) *Attorney, Agent, or Firm* — Maschoff Gilmore & Israelsen

(57) ABSTRACT

In one example, a bail release mechanism includes a bail and a de-latching member. The bail is configured to be attached to the shell of a module that includes a latch pin configured to engage a structure of a host device receptacle to secure the module within the receptacle. The bail is further configured to rotate about a first axis between a latched position and an unlatched position. The first axis is in a fixed position relative to the shell. The de-latching member is attached to the bail at a second axis that is offset from the first axis and is configured to rotate about the second axis. The second axis is movable relative to the shell. The de-latching member includes a first end configured to displace the structure of the receptacle during rotation of the de-latching member to disengage the latch pin from the structure.

19 Claims, 12 Drawing Sheets

BAIL RELEASE MECHANISM FOR COMMUNICATIONS MODULE

CROSS-REFERENCE TO RELATED APPLICATIONS

The present application claims the benefit of and priority to U.S. Provisional Application Ser. No. 61/059,081, entitled "BAIL RELEASE MECHANISM FOR COMMUNICATIONS MODULE," filed Jun. 5, 2008, which application is fully incorporated herein by reference in its entirety.

BACKGROUND

1. Technology Field

Embodiments relate generally to communications modules. More particularly, example embodiments relate to a bail release mechanism for removing communications modules from within receptacles.

2. Related Technology

Communication modules, such as electronic or optoelectronic transceiver or transponder modules, are increasingly used in electronic and optoelectronic communication. Some modules are pluggable, which permits the module to be inserted into and removed from a receptacle of a host device, such as a host computer, switching hub, network router, or switch box. Some host devices include multiple receptacles and can therefore accommodate multiple modules simultaneously. Each module typically communicates with a printed circuit board of the host device by transmitting and/or receiving electrical signals to and/or from the host device printed circuit board. These electrical signals can also be transmitted by the module outside the host device as optical and/or electrical signals.

In order for a module to be pluggable, various latching mechanisms have been developed to secure modules within host device receptacles and to release modules from within host device receptacles. One such latching mechanism requires the use of a de-latching sleeve between the module and the receptacle. De-latching sleeves can be undesirable as the sleeves can get caught between the module and the receptacle and/or the sliding action can cause excess friction and wear out the parts.

Another latching mechanism requires the use of a forward-biased wedge that can be slid backwards to disengage the module from the receptacle. The de-latch action for these types of mechanisms can be awkward as one has to slide the wedge inwards and at the same time pull the module outward. Further, the forward biasing of the wedge can require the integration of a cumbersome spring or other biasing member into the module design.

Yet another latching mechanism requires that one or more components on the module retract into the interior of the module, thereby disengaging from the receptacle and allowing removal of the module from the receptacle. However, space constraints within the module may prevent implementation of this solution.

The subject matter claimed herein is not limited to embodiments that solve any disadvantages or that operate only in environments such as those described above. Rather, this background is only provided to illustrate one exemplary technology area where some embodiments described herein may be practiced

BRIEF SUMMARY OF SOME EXAMPLE EMBODIMENTS

In general, example embodiments relate to bail release mechanisms for removing modules from receptacles.

In one example embodiment, a bail release mechanism includes a bail and a de-latching member. The bail is configured to be attached to the shell of a module that includes a latch pin configured to engage a host device structure of a host device receptacle to secure the module within the receptacle. The bail is further configured to rotate about a first axis between a latched position and an unlatched position. The first axis is in a fixed position relative to the shell. The de-latching member is attached to the bail at a second axis that is offset from the first axis and is configured to rotate about the second axis. The second axis is movable relative to the shell. The de-latching member includes a first end configured to displace the structure of the receptacle during rotation of the de-latching member to disengage the latch pin from the structure.

In another example embodiment, a module includes a shell, at least one printed circuit board ("PCB"), an optical subassembly ("OSA") and a bail release mechanism. The shell includes a latch pin configured to be engaged by a structure of a receptacle into which the module is configured to be removably inserted. The PCB is at least partially positioned within the shell. The OSA is electrically coupled to the PCB. The bail release mechanism includes a bail and a de-latching member. The bail is configured to rotate about a first axis between a latched position and an unlatched position, the first axis being in a fixed position relative to the shell. The de-latching member is configured to disengage the structure from the latch pin. The de-latching member is attached to the bail at a second axis that is offset from the first axis and is configured to rotate about the second axis. The second axis is movable relative to the shell.

In yet another embodiment, the module includes a shell configured to be removably received within a receptacle of a host device. The module also includes means for engaging a structure of the receptacle. The module additionally includes means for disengaging the means for engaging from the structure of the receptacle, the means for disengaging being configured to rotate about a first axis and a second axis that are movable relative to the shell. The module further includes means for actuating the means for disengaging, the means for actuating being configured to rotate about a third axis that is fixed relative to the module.

These and other features of the present invention will become more fully apparent from the following description and appended claims, or may be learned by the practice of the invention as set forth hereinafter.

BRIEF DESCRIPTION OF THE DRAWINGS

To further clarify the above and other features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

Example embodiments relate to a bail release mechanism for use in removing a module from within a receptacle of a host device and to releasably securable modules that include such bail release mechanisms. Some embodiments of the bail release mechanisms disclosed herein enable module insertion and removal while providing a low-profile handle. Some embodiments of the bail release mechanisms also include features that assist in the selective removal of modules from within a receptacle of a host device when desired. Moreover, in some embodiments, the bail release mechanism is configured so as to retract a corresponding de-latching member while a bail of the bail release mechanism is in a latched position so as to prevent malfunction as the module is inserted into a receptacle.

Reference will now be made to the drawings wherein like structures will be provided with like reference designations. It should be understood that the drawings are diagrammatic and schematic representations of exemplary embodiments and, accordingly, are not limiting of the scope of the present invention, nor are the drawings necessarily drawn to scale.

I. Example Operating Environment

Figure 1:
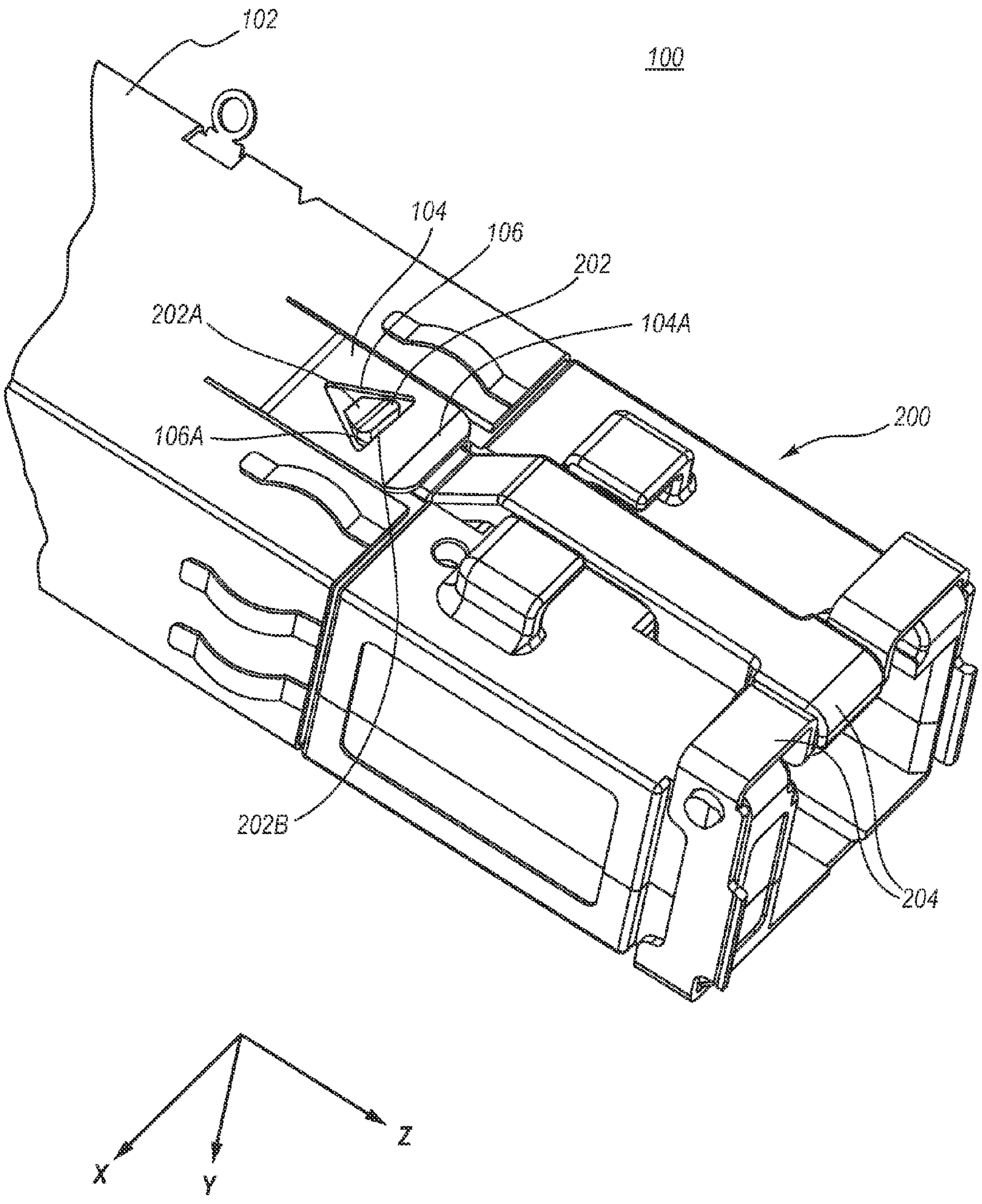
FIG. 1 is an upside-down front perspective view of an example module inserted into an example host receptacle.

Reference is first made to FIG. 1, which illustrates an example operating environment 100. The operating environment 100 includes a receptacle 102, such as a receptacle in a host device. The receptacle 102 includes a tongue 104, the tongue 104 having a leading edge 104A. In the example of FIG. 1, the leading edge 104A is a curved lip to facilitate insertion and removal of a module. Additionally, the tongue 104 defines a cutout 106 sized and configured to receive a corresponding latch pin of a module. In some embodiments, the tongue 104 is composed of a resilient material such that the tongue 104 is configured to flex as a module is inserted into and/or removed from the receptacle 102.

The operating environment 100 further includes a module 200. The view of FIG. 1 illustrates an upside-down front perspective view of the receptacle 102 and module 200. As shown in FIG. 1, the module 200 includes a latch pin 202 formed on a bottom surface of the module 200, the latch pin 202 having a wedge surface 202A.

The module 200 is a pluggable module in some embodiments. As such, the module 200 can be configured to be removably inserted into receptacle 102. For instance, during insertion of the module 200 into the receptacle 102, the wedge surface 202A of latch pin 202 is configured and arranged to make contact with the leading edge 104A of tongue 104. As the module 200 is inserted into the receptacle 102, the wedge surface 202A causes the tongue 104 to flex as the leading edge 104A of the tongue 104 is displaced away from the bottom surface of the module 200 by the wedge surface 202A. However, the cutout 106 is sized to receive the latch pin 202 such that when a leading edge 106A of the cutout 106 clears a trailing edge 202B of the latch pin 202, the tongue 104 resiliently returns to the un-flexed position illustrated in FIG. 1, such that the tongue 102 and latch pin 202 engage each other to secure the module 200 within the receptacle 102. The latch pin 202 is one example of a structural implementation of a means for engaging a structure of a receptacle such as the tongue 102.

The tongue 104 of receptacle 102 is one example of a structure configured to engage the latch pin 202 of the module 200. Other structures can alternately or additionally be employed to engage the latch pin 202. Further, the number and location of latch pins 202 on the module 200 and/or of tongues 104 or other engaging structures on the receptacle 102 can vary depending on the needs of a particular application.

The module 200 additionally includes a bail release mechanism 204 configured to disengage the tongue 104 from the latch pin 202 to enable removal of the module 200 from the receptacle 102. In some embodiments, the disengagement of the tongue 104 from the latch pin 202 is accomplished by "lifting" or otherwise displacing the tongue 104 sufficiently to clear the latch pin 202, as will be disclosed in greater detail below. Further, the bail release mechanism 204 enables removal of the module from the receptacle 102 without the use of a de-latch sleeve, a forward-biased wedge, or an interior retracting latch pin, although this is not required in all embodiments. Some embodiments of the bail release mechanisms disclosed herein may be used in modules with constraints on interior space—such as in modules that include a diplexer positioned in the interior of the module near a latch pin positioned on the exterior of the module—preventing retraction of the latch pin into the interior of the modules, as well as in other modules.

II. Example Module

Figure 2A:
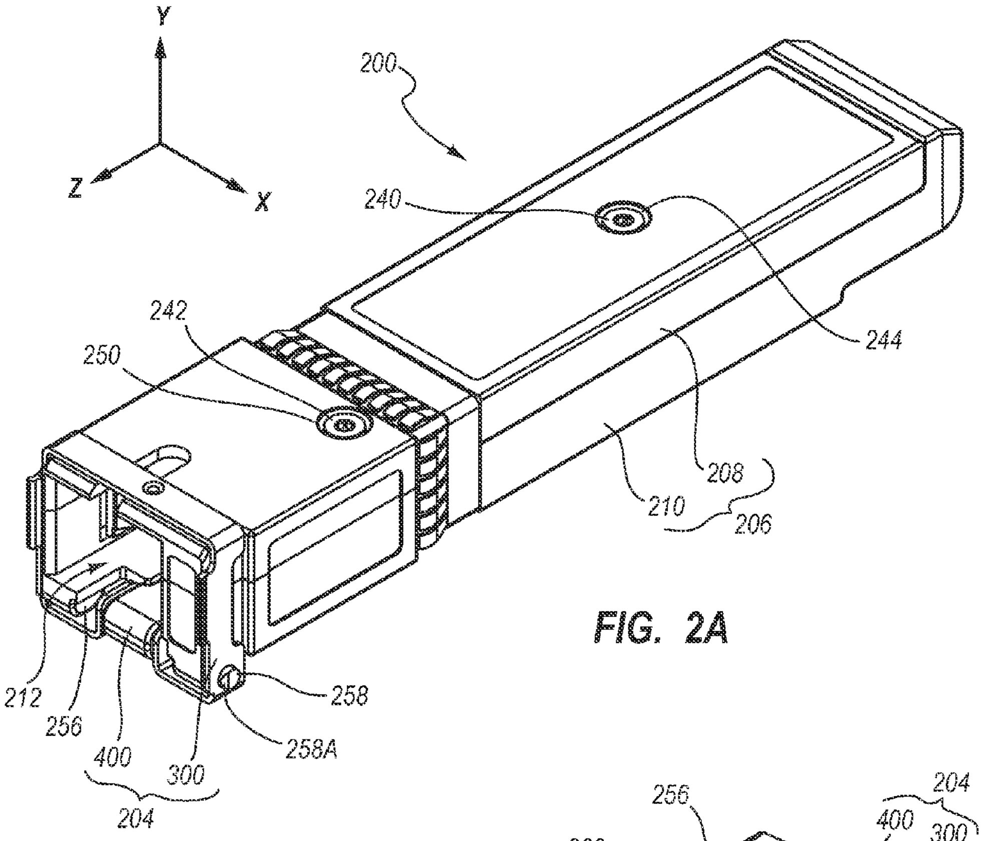
FIGS. 2A-2C are a front perspective view, an upside-down rear perspective view, and an exploded view, respectively, of the example module of FIG. 1.
Figure 2B:
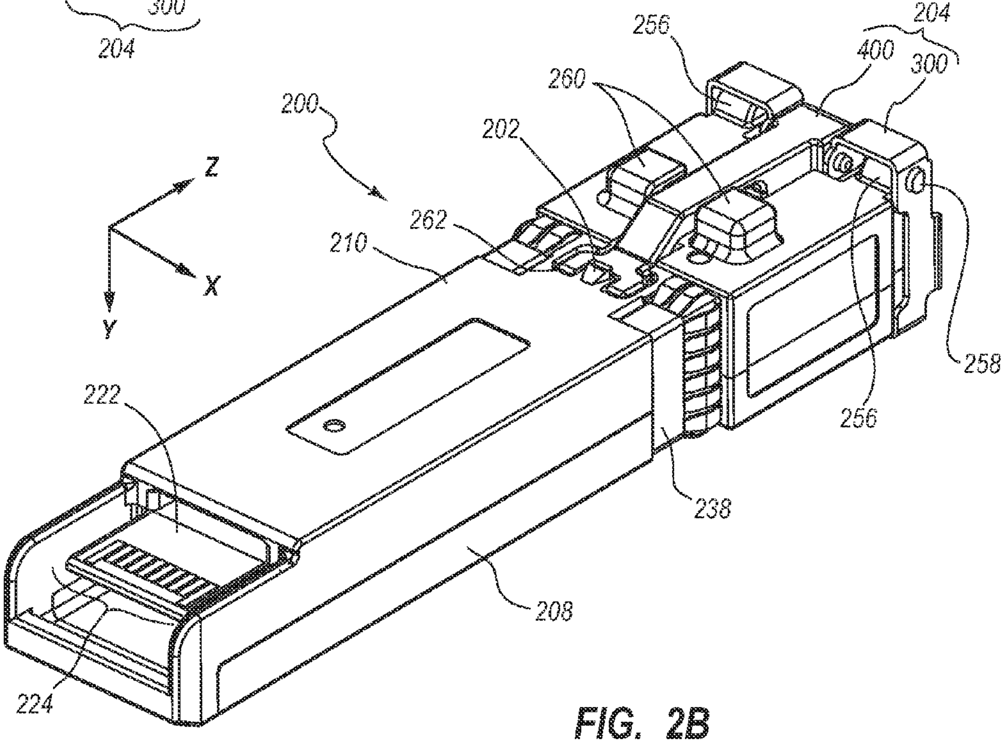
Figure 2C:
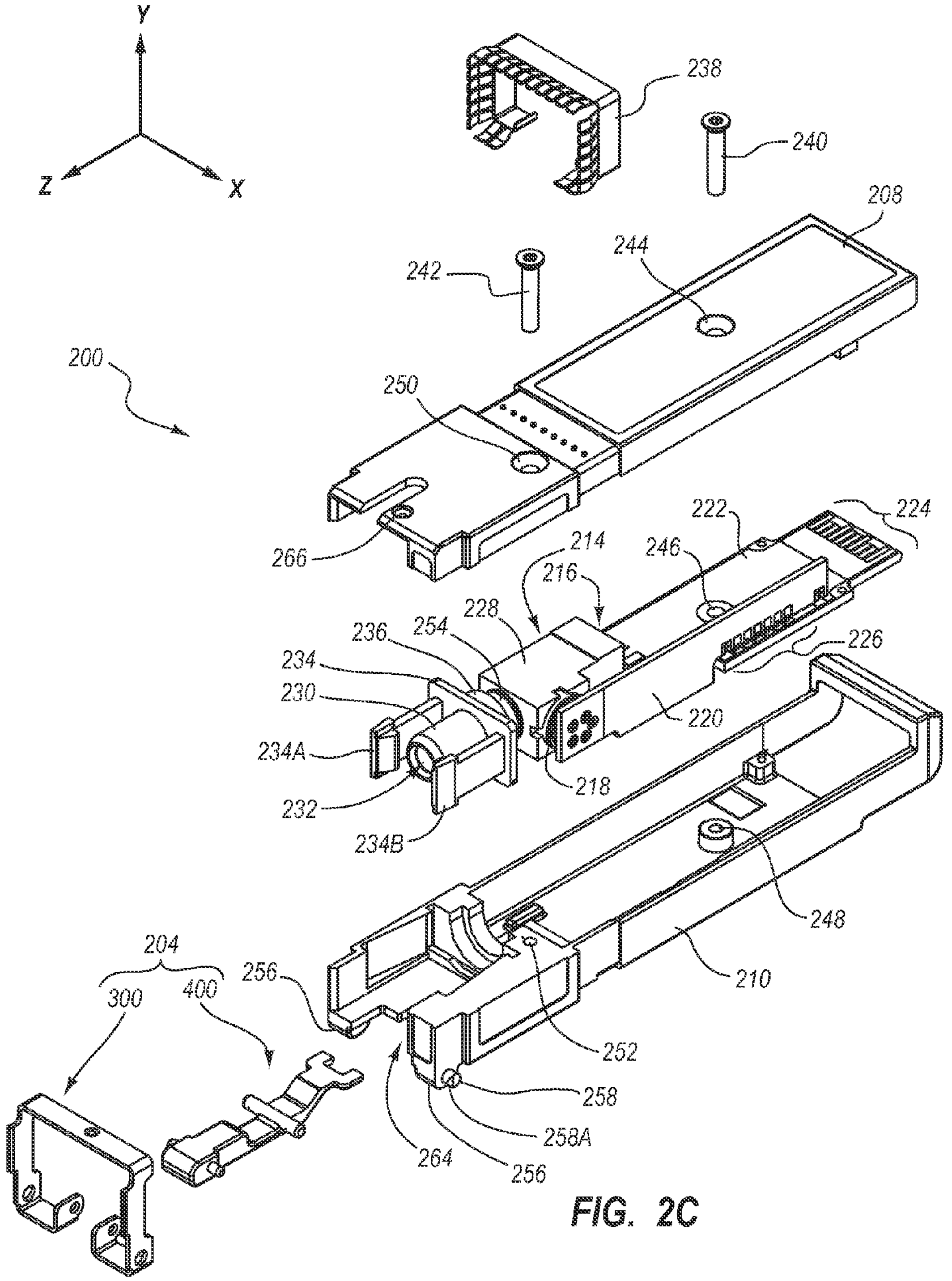

With additional reference to FIGS. 2A-2C, features of the module 200 of FIG. 1 are disclosed in greater detail. The module 200 can be configured for use in transmitting/receiving optical signals that are converted from/to electrical signals that are transmitted to/received from a host device (not shown). As shown in FIG. 2A, the module 200 includes a shell 206 made up of a top shell 208 and a bottom shell 210. The top shell 208 and the bottom shell 210 can be formed using a die casting process. One example material from which the top shell 208 and the bottom shell 210 can be die cast is zinc. Alternately or additionally, the top shell 208 and/or bottom shell 210 may be die cast, injection molded, machined, or otherwise manufactured from zinc or other suitable material (s). Although the shell 206 is illustrated as being made up of two components (i.e., top shell 206 and bottom shell 210), the shell 206 can alternately be made up of a unitary component and/or three or more components.

The shell 206 defines a unitary optical input/output port 212 ("I/O port 212"). The I/O port 212 is configured to receive a fiber optic connector coupled to one or more corresponding optical fibers such that optical signals can be emitted onto and/or received from the optical fiber(s). The I/O port 212 can be configured to receive, for example, LC fiber connectors, SC fiber connectors, or the like or any combination thereof.

As best seen in FIG. 2C, the module 200 includes a unitary OSA 214 configured to both transmit and receive optical signals. For instance, the OSA 214 is a diplexer or diplexer OSA in some embodiments. The module 200 further includes electrical interfaces 216, 218, a first PCB 220, and a second PCB 222 having an edge connector 224. The two electrical interfaces 216 and 218 are used to electrically connect the OSA 214 to the first and second PCBs 220 and 222. A plurality of connections 226 between the PCB 220 and PCB 222 enable the communication of electrical signals between the PCB 220 and PCB 222.

The OSA 214 includes a barrel 228 within which an optical transmitter (not shown) such as a laser and an optical receiver (not shown) such as a photodiode are disposed. The optical transmitter is configured to convert electrical signals received through the PCB 222 and electrical interface 216 from a host device (not shown) into corresponding optical signals. The optical receiver is configured to convert optical signals received from an optical network (not shown) into corresponding electrical signals for transmission to a host device (not shown) through the electrical interface 218, PCB 220, connections 226 and PCB 222.

The OSA 214 also includes a nose 230 defining a port 232. The port 232 is configured to optically connect the optical transmitter and optical receiver positioned within the barrel 228 with a fiber-ferrule (not shown) positioned within the I/O port 212 to enable the transmission of optical signals between the OSA 214 and optical network. A positioning member 234 can be provided which slides over the nose 230 and is positioned adjacent a flange 236 of the OSA 214. The positioning member 234 may thereby help secure the OSA 214 in an accurate x, y, and z optical alignment within the port 212 of the shell 206 and/or may include one or more latches 234A and 234B configured to secure the fiber ferrule (not shown) within the port 212. Although the module 200 includes a unitary OSA 214, the principles of the invention are equally applied to modules having two or more OSAs or to modules without any OSAs at all.

The module 200 further includes a collar clip 238 and a plurality of fasteners 240 and 242. The collar clip 238 performs an EMI containment function in conjunction with a receptacle of a host device (not shown) when the module 200 is plugged into the receptacle of the host device. In some embodiments, the fastener 240 is inserted through fastener hole 244 in top shell 208 and through a corresponding hole 246 in the PCB 222 to engage a tapped hole 248 formed in the bottom shell 210. Similarly, the fastener 242 is inserted through fastener hole 250 to engage a second tapped hole 252 formed in the bottom shell 210. In some embodiments, fastener 242 occupies some of the space near a neck 254 of the OSA 214 between the barrel 228 and positioning member 234 such that the fastener 242 is not inserted through a hole in the PCB 222. In this manner, the fasteners 240 and 242 are used to secure the top shell 208 and bottom shell 210 together. Alternately or additionally, less than two or more than two fasteners 240 and 242 can be used to secure the top shell 208 and bottom shell 210 together. Other means for securing the top shell 208 and the bottom shell 210 together can alternately or additionally be implemented, such as clips, adhesives, solder, screws, bolts, nuts, and the like or any combination thereof.

As best seen in FIGS. 2B and/or 2C, the module 200 further includes bail release mechanism 204, latch pin 202, a pair of tabs 256, a pair of posts 258, pivot seat 260, a first recess 262 and slot 264 defined in the bottom shell 210, and a second recess 266 formed in the top shell 208. Aspects of the aforementioned components will be described in greater detail below.

The module 200 can be configured to optical signal transmission and reception at a variety of per-second data rates including, but not limited to, 1 Gigabit per second ("G"), 2 G, 2.5 G, 4 G, 8 G, 10 G, or higher. Furthermore, the module 200 can be configured for optical signal transmission and reception at various wavelengths including, but not limited to, 850 nm, 1310 nm, 1470 nm, 1490 nm, 1510 nm, 1530 nm, 1550 nm, 1570 nm, 1590 nm, or 1610 nm, without restriction. Further, the module 200 can be configured to support various transmission standards including, but not limited to, Fast Ethernet, Gigabit Ethernet, 10 Gigabit Ethernet, and 1x, 2x, 4x, and 10x Fibre Channel.

As shown in FIGS. 2A-2C, the module 200 is configured to have a form factor that is substantially compliant with the SFP MSA. In other embodiments, the module 200 can alternatively be configured to have any one of a variety of different form factors that are substantially compliant with other MSAs including, but not limited to, the SFF MSA or the SFP+ (IPF) MSA. Also, although the example module 200 is configured as an optoelectronic transceiver module, the example bail release mechanisms disclosed herein can also benefit other modules such as optoelectronic transponder modules or electronic transceiver or transponder modules.

III. Example Bail Release Mechanism

With continued reference to FIGS. 2A-2C, the bail release mechanism 204 generally includes a bail 300 and a de-latching member 400 configured to cooperate with each other in releasing and/or removing the module 200 from a receptacle of a host device (not shown), such as the receptacle 102 of FIG. 1.

Figure 3A:
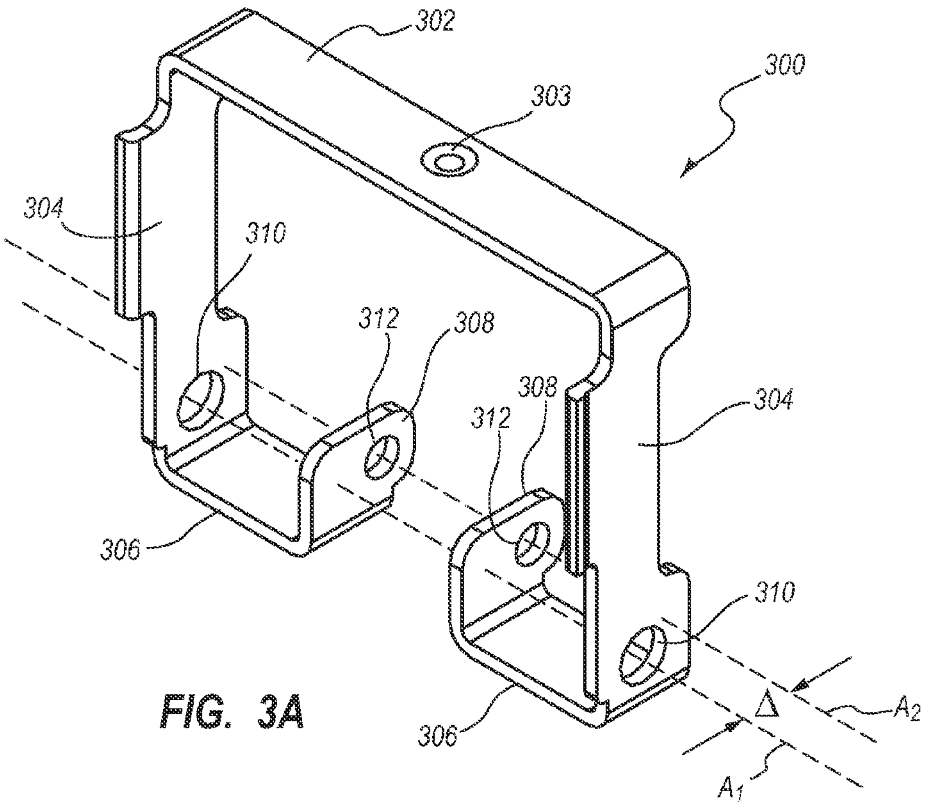
FIGS. 3A and 3B are a front perspective view and a rear perspective view of an example bail that can be implemented in a bail release mechanism of the module of FIGS. 2A-2C.
Figure 3B:
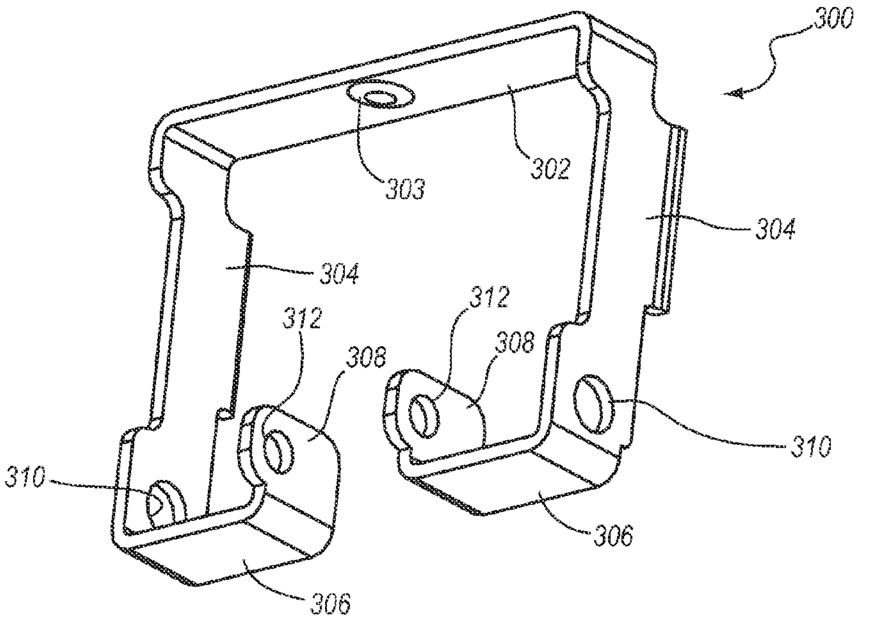

With additional reference to FIGS. 3A and 3B, aspects of the bail 300 are disclosed in greater detail. In some embodiments, the bail 300 is composed of sheet metal, though other suitable material(s) can alternately or additionally be used. The bail 300 includes a handle 302 that can be grasped by a user in order to reposition the bail 300 and in order to remove the module 200 from a receptacle of a host device (not shown). The bail 300 also includes a downward-extending protrusion 303 defined in the handle 302, a pair of arms 304 connected to the handle 302, a pair of bases 306 connected to the arms 304, respectively, and a pair of fingers 308 connected to the bases 306, respectively.

Each of the arms 304 includes a shell post hole 310, and each of the fingers 308 includes a de-latching member post hole 312. As shown in FIG. 3A, the two shell post holes 310 are substantially coaxial and define a first axis $A_1$. The two de-latching member post holes 312 are also substantially coaxial and define a second axis $A_2$. The two shell post holes 310 are offset with respect to the de-latching member post holes 312. As such, the axis $A_1$ and the axis $A_2$ are offset a distance $\Delta$ from each other.

With combined reference to FIGS. 2A-3B, the bail 300 is attached to the module 200 such that the posts 258 extend into shell post holes 310, allowing the bail 300 to rotate about the axis $A_1$. In some embodiments, the travel angle of the bail 300 relative to the module 200 is approximately 60 degrees. In other embodiments, the travel angle of the bail 300 relative to the module 200 is more or less than 60 degrees.

As best seen in FIG. 3B, the protrusion 303 extends downward from the underside of the handle 302 of the bail 300. As best seen in FIG. 2C, the top shell 208 includes a recess 266 that generally corresponds in size and location to the protrusion 303. With combined reference to FIGS. 2C and 3B, the protrusion 303 is positioned to interfere with the top shell 208. However, the bail 300 is configured to flex slightly so that the interference between the protrusion 303 and the top shell 208 can be overcome when the bail 300 is rotated about the axis $A_1$ from an unlatched position into a latched position. As used herein, the term “latched position” refers to a position of the bail 300 that results in the latch pin 202 engaging a corresponding structure of a host device, such as the tongue 104 of the receptacle 102 of FIG. 1. As used herein, the term “unlatched position” refers to a position of the bail 300 that results in the latch pin 202 being disengaged from a corresponding structure of a host device.

With continued reference to FIGS. 2C and 2B, as the bail 300 is rotated into the latched position, the protrusion 303 releasably engages the recess 266 by seating in the recess 266, thereby releasably securing the bail 300 in the latched position. The protrusion 303 and the recess 266 can thus provide tactile feedback to a user as the protrusion 303 seats in the recess 266. This securement of the bail 300 in the latched position can avoid the inadvertent release of the bail 300 from the latched position. In addition, a user can apply a deliberate force to the bail 300 to disengage the protrusion 303 from the recess 266 in order to release the bail 300 from the latched position.

It is noted that the size, location, number, and shape of the protrusion 303 and/or recess 266 disclosed in FIGS. 2C and 3B can vary in alternative embodiments. For example, the size of the protrusion 303 and/or the recess 266 can be increased or decreased. In addition, the protrusion 303 and the recess 266 can be located anywhere along the top or sides of the bail 300 and the shell 206, respectively. Further, multiple protrusion/recess pairs can be included in the bail 300 and the shell 206. Also, the shape of the protrusion 303 and the recess 266 need not be substantially circular as disclosed in FIGS. 2C and 3B, but could instead by any other suitable shape, such as an elongated bar shape, for instance. Finally, the respective locations of the protrusion(s) 303 and the recess(es) 266 can be reversed, with the protrusion 303 being defined in the shell 206 and the recess 266 being defined in the bail 300.

Optionally, the bail 300 may further include one or more visible indicators (not shown) that provide information concerning one or more characteristics of the module 200. The visible indicators of the bail 300 can include, for instance, color-coded portions, raised or depressed characters, printed characters, or any other visible indicator that can serve to identify characteristics of the module.

Figure 4A:
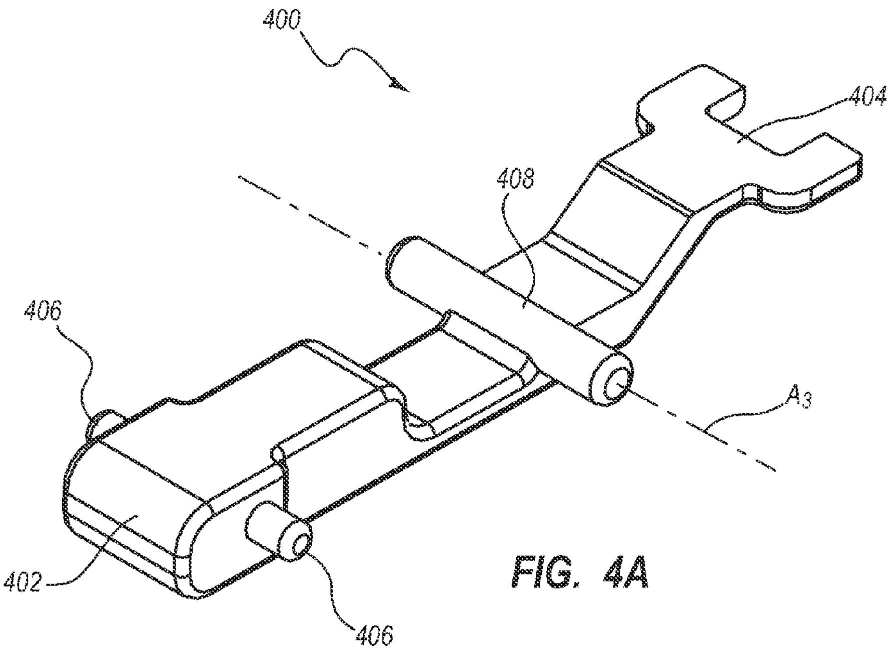
FIGS. 4A and 4B are a front perspective view and an upside-down rear perspective view, respectively, of an example de-latching member that can be implemented in a bail release mechanism of the module of FIGS. 2A-2C.
Figure 4B:
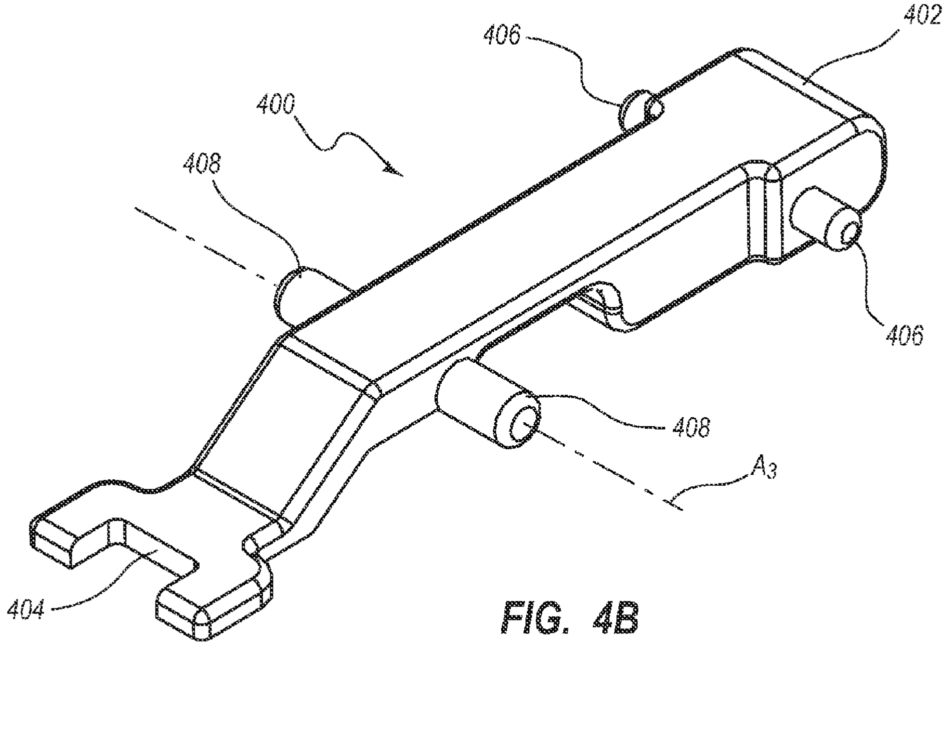

With additional reference now to FIGS. 4A and 4B, details of the example de-latching member 400 are disclosed. The de-latching member 400 is composed in some embodiments of a zinc cast material, but in other embodiments, any suitable material(s) can be employed including, but not limited to, thermoplastics, machined aluminum, other machined materials, sheet metal, stainless steel formed by metal injection molding or other processes, or the like or any combination thereof.

As shown in FIGS. 4A and 4B, de-latching member 400 includes a first end 402 and a second end 404. Note that the terms “first” and “second” are used solely for convenience in distinguishing the end 402 from the end 404. Two oppositely extending de-latching member posts 406 are included on the first end 402 of the de-latching member 400, and a pivot bar 408 is included on the top surface of the de-latching member 400. The pivot bar 408 defines a third axis $A_3$, as disclosed in FIGS. 4A and 4B. The de-latching member posts 406 are coaxial with each other and configured to be inserted into the de-latching member post holes 312 of the bail 300 (FIGS. 3A-3B).

Figure 5A:
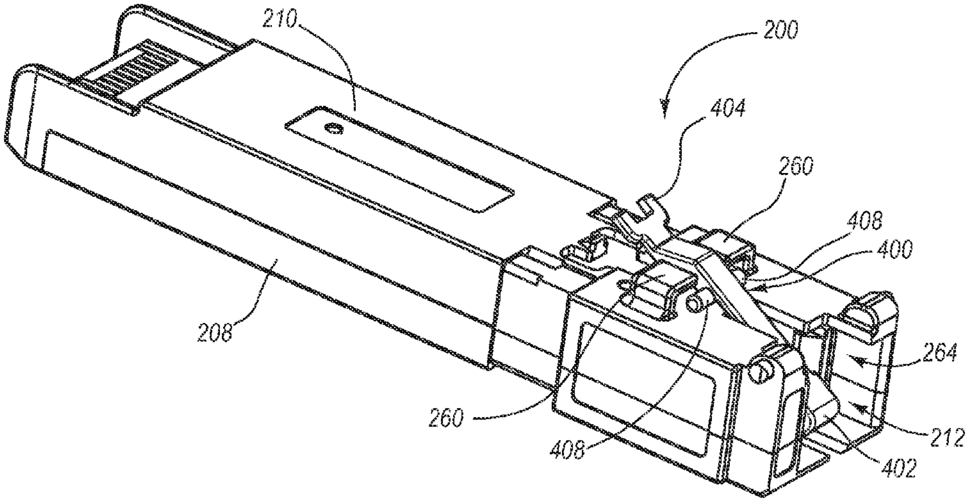
FIGS. 5A-5E are various upside-down perspective views of the module of FIGS. 2A-2C during attachment of a bail release mechanism to the module.

With additional reference to FIGS. 5A-5E, details of an example process of assembling an embodiment of the bail release mechanism 204 in the module 200 are disclosed. As shown in FIG. 5A, the de-latching member 400 is tilted at an angle relative to the module 200 and partially inserted into the module 200 through the slot 264 such that the first end 402 of the de-latching member 400 extends into the input/output port 212 and the second end 404 extends outwards above the bottom shell 210 in the upside-down orientation of FIG. 5A. Of course, if the module 200 were oriented top-side up, the second end 404 would actually be extending below the bottom shell 210.

Figure 5B:
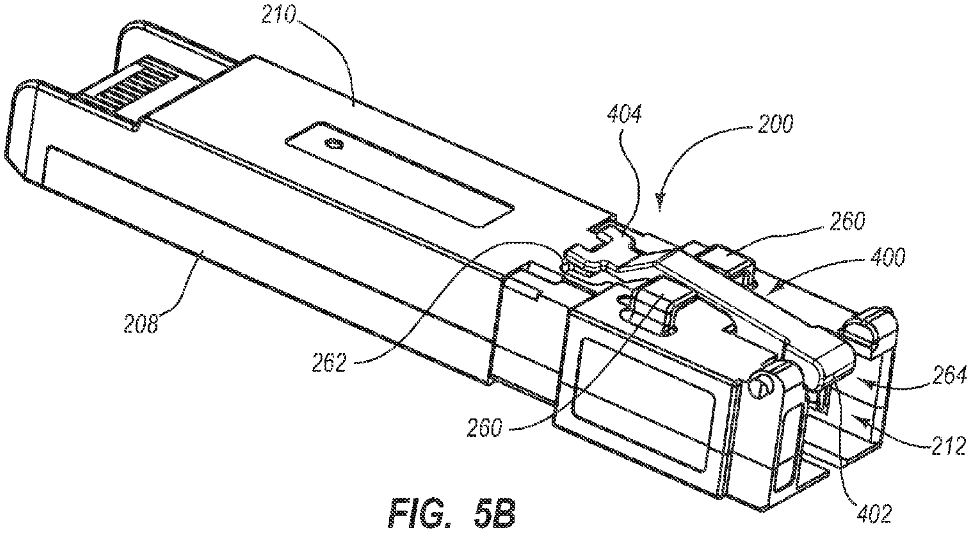

The de-latching member 400 is slid backwards until the pivot bar 408 is seated in the pivot seat 260, as shown in FIG. 5B.

Figure 5C:
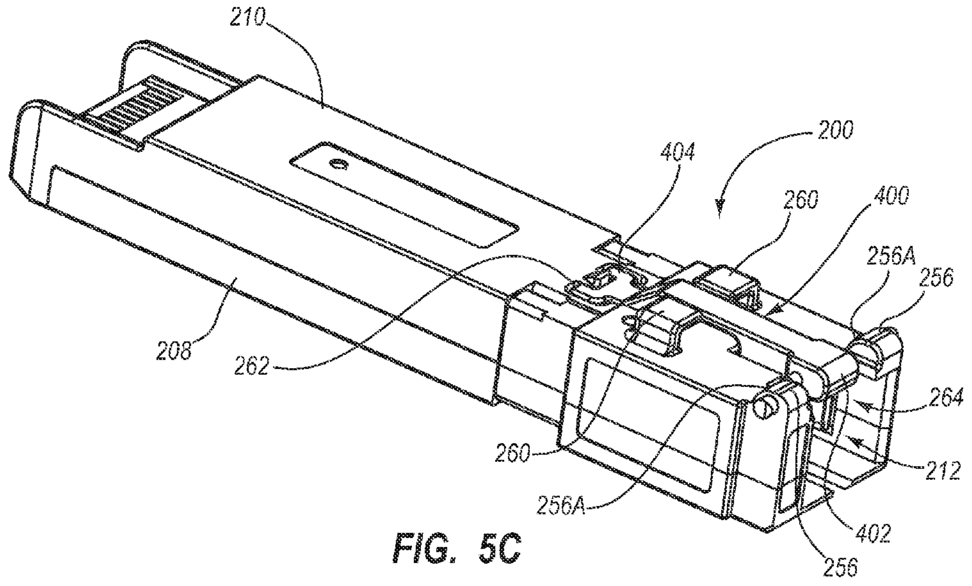

The de-latching member 400 is then rotated about the axis $A_3$ (see FIGS. 4A-4B) defined by the pivot bar 408 until the second end 404 of the de-latching member 400 is seated within the recess 262 defined in the bottom shell 210, as shown in FIG. 5C. In some embodiments, the recess 262 and second end 404 of the de-latching member 400 are complementary in size and shape, although this is not required in all embodiments. Alternately or additionally, the second end 404 of the de-latching member 400 can be formed smaller and/or in a different shape than the recess 262.

The second end 404 of the de-latching member 400 is also configured to be substantially flush with the bottom surface of bottom shell 210 when in the position illustrated in FIG. 5C to avoid interfering with the leading edge of a receptacle when the module 200 is inserted into the receptacle.

FIG. 5C additionally illustrates the tabs 256 formed in the bottom shell 210. Each tab 256 includes a back surface 256A. Additional aspects of the back surfaces 256A are discussed below.

Figure 5D:
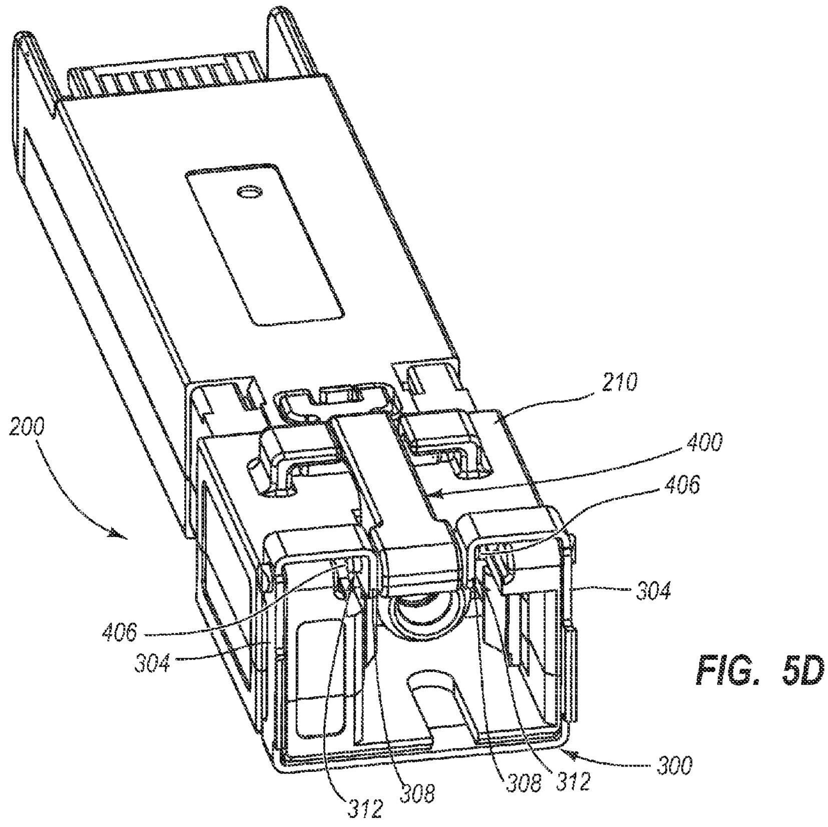
Figure 5E:
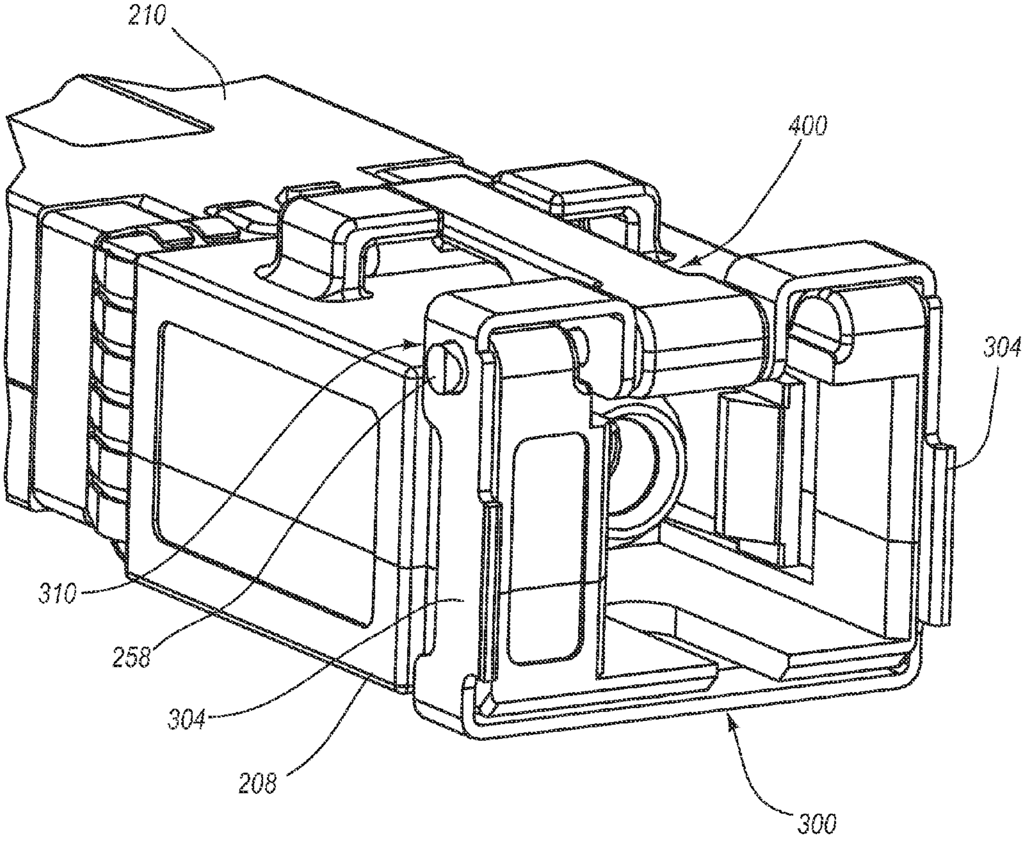

After the de-latching member 400 has been positioned as illustrated in FIG. 5C, the bail 300 is operably connected to the de-latching member 400 and the module 200, as shown in FIGS. 5D and 5E. The bail 300 is opened to attach to the de-latching member 400 and the module 200. More particularly, the arms 304 of the bail 300 are flexed outward such that the distance between the fingers 308 of the bail 300 is increased sufficiently to clear the de-latching member posts 406 and allow the de-latching members posts 406 to be aligned with and inserted into the de-latching member post holes 312, as shown in FIG. 5D. At the same time or at a different time, the shell posts 258 of the module 200 are aligned with and inserted into the shell post holes 310, as illustrated in FIG. 5E. Accordingly, the bail 300 can comprise a resilient material such that the bail 300 resiliently regains the shape shown in FIGS. 3A and 3B after the arms 304 are outwardly flexed to clear the de-latching member posts 406 and the shell posts 258.

In some embodiments, each of the shell posts 258 of the module 200 includes a wedge portion 258A, as best seen in FIGS. 2A and 2C. In these and other embodiments, the de-latching member 400 can be positioned as shown in FIG. 5C and then have the de-latching member posts 406 aligned with and inserted into the de-latching member post holes 312 of the bail 300. From this point, the bail 300 can then be moved into the position shown in FIG. 5E, sliding along the wedge portions 258A of the shell posts 258. The sliding along the wedge portions 258A causes the arms 304 of the bail 300 to flex outward in order for the arms 304 to slide past the shell posts 258 until the shell posts 258 are inserted into respective shell post holes 310.

IV. Example Operation of a Bail Release Mechanism

Figure 6A:
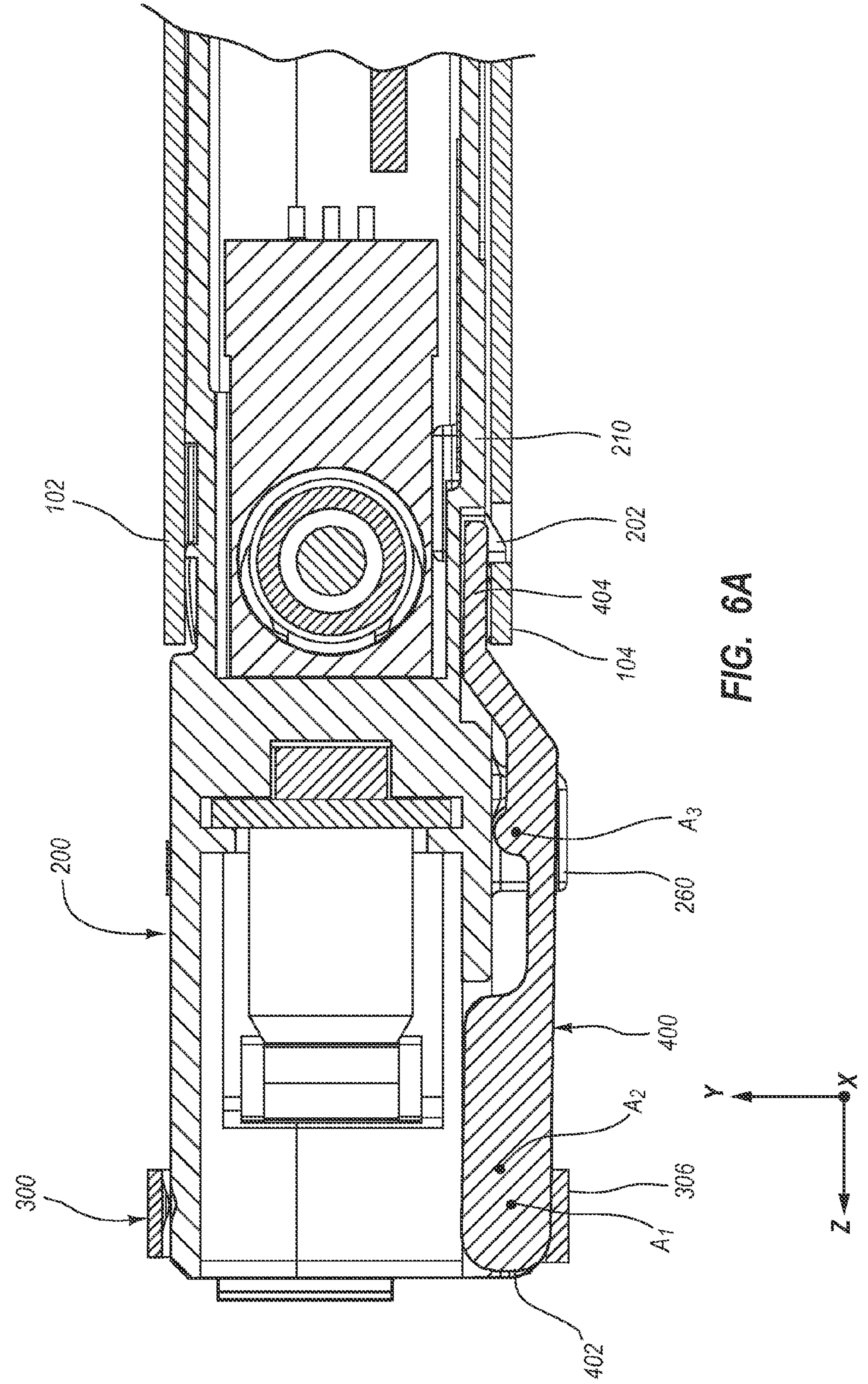
FIG. 6A is a cross-sectional side view of the module of FIG. 2A with a bail release mechanism in a latched position.
Figure 6B:
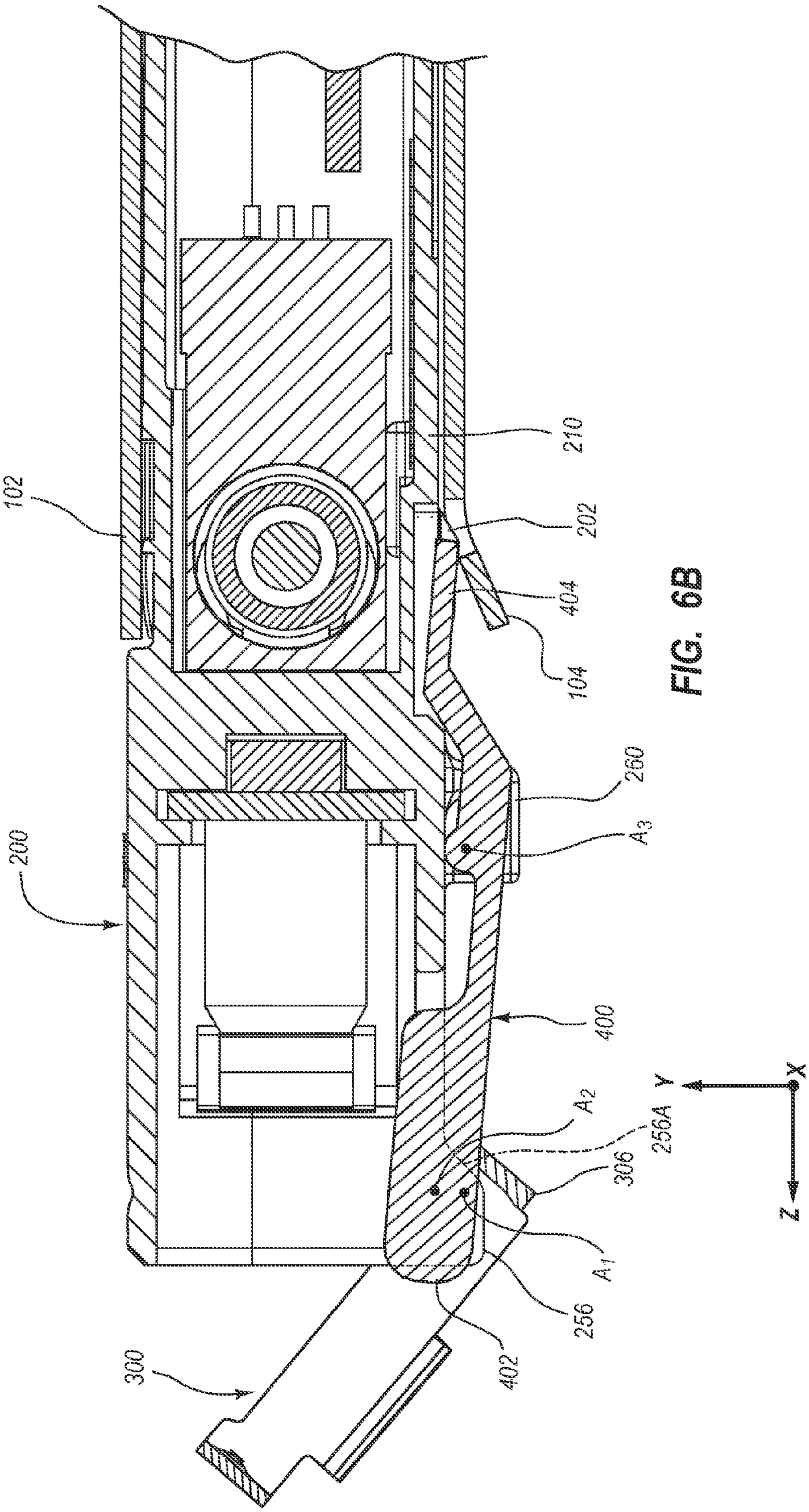
FIG. 6B is a cross-sectional side view of the module of FIG. 2A with the bail release mechanism in an unlatched position.

With additional reference now to FIGS. 6A-6B, aspects of the operation of the example bail release mechanism 204 are disclosed. FIGS. 6A-6B illustrate cross-sectional side views of the module 200 inserted into the receptacle 102 of FIG. 1. In FIG. 6A, bail release mechanism 204 is in a latched position. In FIG. 6B, bail release mechanism 204 is in an unlatched position.

As disclosed in FIG. 6A, when the bail 300 is positioned in the latched position and the module 200 is positioned within the receptacle 102, the latch pin 202 and tongue 104 or other corresponding structure of receptacle 102 engage each other to secure the module 200 within the receptacle 102 of FIG. 1. As can be seen in FIG. 6A, the second end 404 of the de-latching member 400 is substantially flush with the bottom of the bottom shell 210 in the latched position.

As disclosed in FIG. 6B, rotation of the bail 300 around the axis $A_1$ from the latched position to the unlatched position causes a corresponding rotation of the de-latching member 400 about the axes $A_2$ and $A_3$. Because axis $A_1$ is the only one of axes $A_1$-$A_3$ that is fixed with respect to the module 200 and because the axes $A_2$ and $A_3$ are offset from the axis $A_1$, the axes $A_2$ and $A_3$ move in relation to the axis $A_1$ and module 200. Thus, in the example of FIGS. 6A-6B, the Axis $A_2$ rotates counterclockwise relative to the axis $A_1$ as the bail 300 is rotated from the latched position to the unlatched position, causing the first end 402 of the de-latching member 400 to raise up in the y-direction relative to the fixed axis $A_1$. The de-latching member post holes 312 and the de-latching member posts 406 allow the de-latching member 400 to rotate about the axis $A_2$.

Further, the axis $A_3$ moves forward in the arbitrarily-defined positive z-direction relative to the fixed axis $A_1$ as the bail 300 is rotated from the latched position to the unlatched position. The pivot seat 260 allows the axis $A_3$ to move forward and backward in the z-direction, while substantially maintaining the y-position of the axis $A_3$ constant. The pivot seat 260 also allows the de-latching member 400 to pivot about the axis $A_3$.

Accordingly, as the bail 300 rotates about the fixed axis $A_1$ from the latched position to the unlatched position, the de-latching member 400 rotates about the axes $A_2$ and $A_3$ and moves substantially in the positive z-direction, causing the first end 402 to also move in the positive y-direction and the second end 404 to also move in the negative y-direction. Thus, the second end 404 extends away from the bottom of the bottom shell 210 such that the second end 404 is no longer flush with the bottom of the bottom shell 210. The extension of the second end 404 away from the bottom shell 210 "lifts" or otherwise displaces the tongue 104 of the receptacle 102, causing the tongue 104 to flex in the negative y-direction until the tongue 104 eventually clears and disengages from the latch pin 202. After the latch pin 202 and tongue 104 have been disengaged from each other as described herein, the module 200 can be pulled from the receptacle 102.

As shown in FIGS. 6A-6B, the offset axes $A_1$-$A_3$ enable the rotational movement of the bail 300 to be converted into a translational movement of the second end 404 of the de-latching member 400 in the y-direction and z-direction. The translational movement of the second end 404 in the positive z-direction results in the second end 404 sliding along the tongue 104 as the second end 404 moves forward, which assists in and facilitates removal of the module 200 from the receptacle 102 in some embodiments.

Accordingly, the bail 300 is one example of a structural implementation of a means for actuating the de-latching member 400. Additionally, the de-latching member 400 is one example of a structural implementation of a means for disengaging the latch pin 202 and the tongue 104 from each other.

In some embodiments, when the bail 300 is positioned in the unlatched position of FIG. 6B, the bail 300 is positioned such that the bases 306 of the bail engage rear surfaces 256A of the shell tabs 256. This position enables the bail 300 to pull against not only the shell posts 258 (see FIGS. 2A-2B), but also against the rear surfaces 256A of the shell tabs 256. The additional structural support provided to the module 200 by the shell tabs 256 results in the ability of the module 200 to withstand a relatively greater pull force than in modules where the shell tabs 256 are not present. The ability to withstand a relatively greater pull force is desirable as the ability allows the module 200 to be removed from a receptacle quickly with little or no risk of damaging the bail 300 or the module 200.

Alternately or additionally, with combined reference to FIGS. 2B and 6A, the bail release mechanism 204 is configured to self-retract to avoid interfering with a receptacle 102 of a host device during insertion. In particular, the intuitive position for the bail 300 during device insertion is in the latched position shown in FIG. 6A because this position allows a user to push the module 200 into the host receptacle by the 206 of the module 200, rather than by pushing the module 200 into the host receptacle by the relatively less solid and stable bail 300. When the bail 300 is placed in the latched position of FIG. 6A, the second end 404 of the de-latching member 400 self retracts within the recess 262 defined by the bottom shell 210 of the module 200 such that the second end 404 is substantially flush with the bottom shell 210 and does not interfere with the leading edge 104A of the receptacle 102 during insertion. In contrast, in the de-latched position shown in FIG. 6B, a user would have to try to balance the position of the bail 300 in order to push on it to insert the module 200 into the receptacle 102.

Thus, the example bail release mechanism 204 can be used to selectively release the module 200 from within the receptacle 102 of a host device (not shown). Some embodiments of the bail release mechanism 204 enable module 200 removal while providing a handle such as the bail 300 that is capable of withstanding relatively high pull forces. Alternately or additionally, the bail release mechanism 204 assists in pushing the module 200 out of the receptacle 102, thereby facilitating removal of the module 200 from the receptacle 102.

V. Alternate Embodiments

It will be appreciated by those of skill in the art, with the benefit of the present disclosure, that the example module 200 and bail release mechanism 204 illustrated in FIGS. 2A-2C (and other Figures) are provided by way of illustration only, and should not be construed to limit the invention. Indeed, embodiments of the invention include modules that are substantially compliant with the same or different form factors than the SFP MSA form factor and/or bail release mechanisms having different or additional features from those illustrated in FIGS. 1-6B.

Figure 7A:
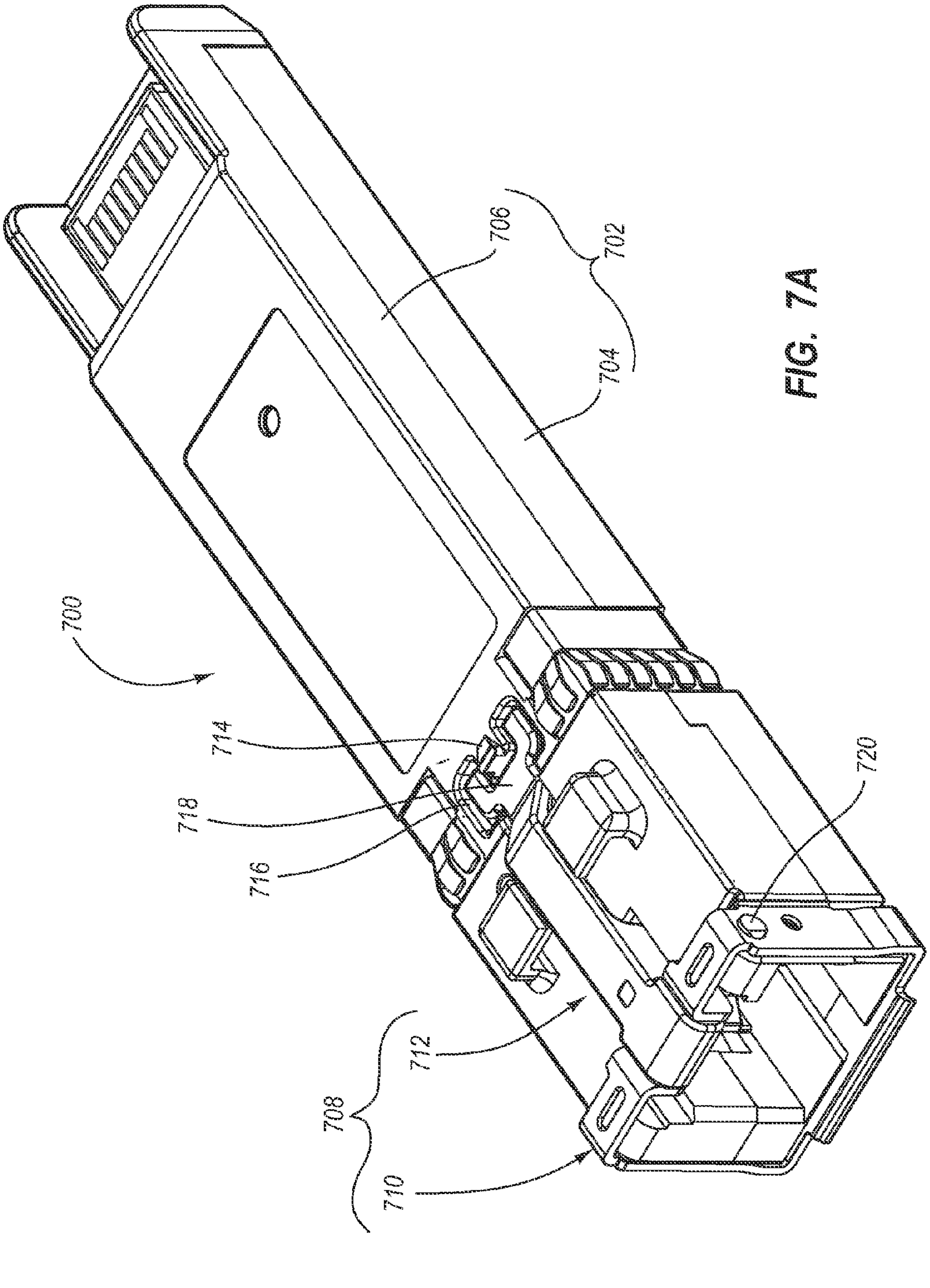
FIGS. 7A-7C illustrate another example of a module and bail release mechanism.
Figure 7B:
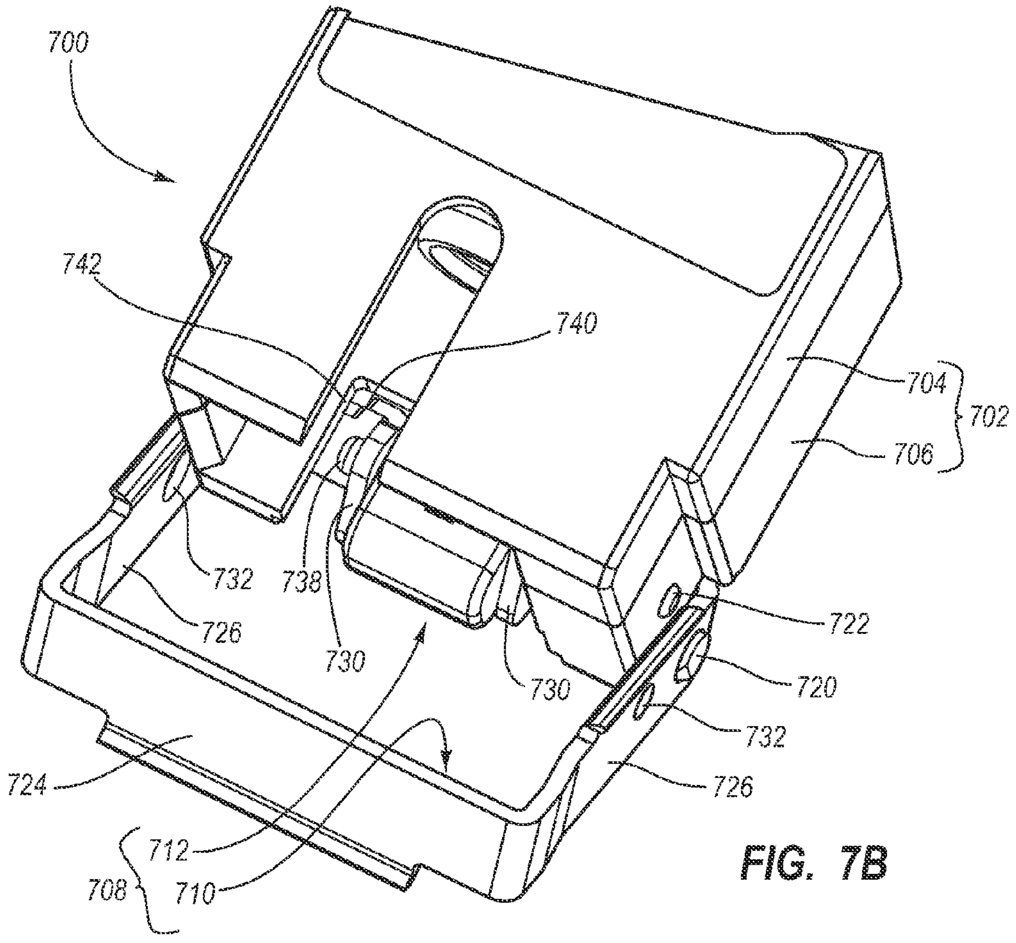

For instance, FIGS. 7A-7B depict a module 700 that is different than the module 200 described above. FIG. 7A depicts an upside-down perspective view of the module 700. The module 700 is similar in many respects to the module 200 described above, and similar features will not be described in detail herein. As shown in FIG. 7A, the module 700 includes a shell 702 made up of a top shell 704 and bottom shell 706 and a bail release mechanism 708 including a bail 710 and de-latching member 712. The bail release mechanism 708 is shown in a latched position in FIG. 7A. FIG. 7B illustrates the module 700 with the bail release mechanism 708 in an unlatched position.

As seen in FIG. 7A, the module 700 includes a latch pin 714 and recess 716 formed in the bottom shell 706. The latch pin 714 is similar in some respects to the latch pin 202 of FIGS. 2A-2B and is generally configured to engage a corresponding structure of a host device, such as the tongue 104 of the receptacle 102 of FIG. 1. In some embodiments, such host devices are designed such that there is little space in which the tongue or other structure can flex or otherwise be displaced to disengage the latch pin 714 from the tongue or other structure.

Accordingly, in some embodiments, a height of the latch pin 714 is shorter than permitted by the SFP MSA or other MSA with which the module 700 is otherwise substantially compliant. The relatively lower height of the latch pin 714 (compared to latch pin heights conforming to the SFP MSA or other MSA) allows the tongue or other structure of the host device to be disengaged from the latch pin 714 with less flexure of the tongue or other structure than would be required if the height of the latch pin 714 conformed to the latch pin height requirement of the SFP MSA or other MSA. In some cases, except for having a latch pin 714 with a lower height than permitted by the SFP MSA or other MSA, the module 700 may otherwise be substantially compliant with the SFP MSA or other MSA.

Further, with combined reference to FIGS. 2A-2C and 7A-7B, in this and other embodiments, the recess 716 may be relatively deeper than the recess 262 formed in modules 200 having latch pin 202 heights that conform to the SFP MSA or other MSA such that a first end 718 of de-latching member 712 is seated sufficiently deeply within the recess 716 to not interfere with the engagement of the latch pin 714 having the relatively shorter height by the tongue or other structure of the host device. For instance, the depth of the recess 716 may be deeper than the thickness of the first end 718 of de-latching member 712 such that the first end 718 is received completely within the recess 716 with room to spare. Alternately or additionally, the extra space is sufficient in some embodiments to accommodate a tongue or other structure of a host device being biased into the extra space to ensure secure engagement of the latch pin 714 by the tongue or other structure.

With combined reference to FIGS. 7A and 7B, the module 700 additionally includes a pair of shell posts 720 formed on opposite sides of the bottom shell 706, with one shell post 720 being visible in each of FIGS. 7A and 7B. The module 700 additionally includes a pair of protrusions 722 (only one is visible in FIG. 7B) which are also formed on opposite sides of bottom shell 706. Details regarding the shell posts 720 and protrusions 722 are described in greater detail below.

Figure 7C:
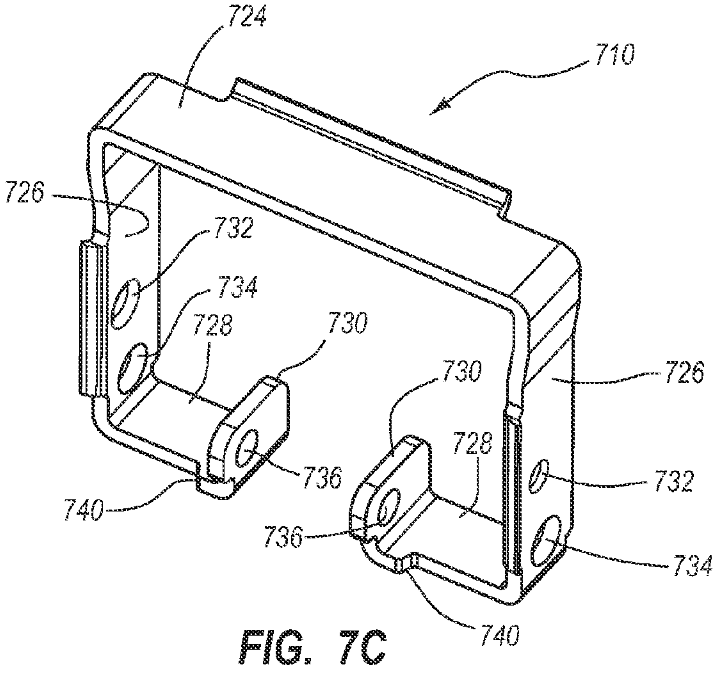

Turning next to FIG. 7C, a rear perspective view of the bail 710 is provided. Similar to the bail 300 of FIGS. 3A and 3B, the bail 710 includes a handle 724, a pair of arms 726 connected to the handle 724, a pair of bases 728 connected to the arms 726, respectively, and a pair of fingers 730 connected to the bases 728, respectively.

Each of the arms 726 includes a recess 732. As best understood with reference to FIG. 7B, the recesses 732 generally correspond in size and location to the protrusions 722. With combined reference to FIGS. 7B-7C, the protrusions 722 of module 700 are configured to interfere with the arms 726 of bail 710. However, the bail 710 is configured to flex slightly so that the interference between the protrusions 722 and the arms 726 can be overcome when the bail 710 is rotated from an unlatched position to a latched position. As the bail 710 is rotated into the latched position, the protrusions 722 releasably engage the recesses 732 by seating in the recesses 732, thereby releasably securing the bail 710 in the latched position.

As shown in FIG. 7C, each of the arms 304 additionally includes a shell post hole 734, and each of the fingers 730 includes a de-latching member post hole 736. The two shell post holes 734 are configured to receive the shell posts 720 (FIGS. 7A-7B), are substantially coaxial with each other and define a first axis (not shown). The two de-latching member post holes 736 are configured to receive de-latching member posts 738 (only one of which is shown in FIG. 7B), are substantially coaxial with each other and define a second axis (not shown). The first axis and second axis are offset from each other such that the bail 710 and bail release mechanism 708 operate in a substantially similar manner to the bail 300 and bail release mechanism 204 as described above with respect to FIGS. 6A and 6B.

With continued reference to FIG. 7C, each of the bases 728 includes a shoulder 740. The shoulders 740 are configured to engage the bottom shell 706 of the module 700 to substantially prevent or reduce the likelihood of the shell post holes 734 disengaging from the shell posts 720 when a force is applied to the bail 710 handle 724 during disengagement and removal of the module 700 from a host device. For instance, as shown in FIG. 7B, the shoulders 740 are configured to engage cutouts 742 or other features formed in the bottom shell 706 (only one of shoulders 740 and cutouts 742 is visible in FIG. 7B).

Features of the bail 710 and shoulders 740 are explained as follows. The bail 710 is moved to the unlatched position shown in FIG. 7B to disengage the latch pin 714 (FIG. 7A) from a tongue or other structure of a host device receptacle (not shown). A user exerts a force on the bail 710 to move the bail 710 from the latched position (FIG. 7A) to the unlatched position (FIG. 7B), which is generally accomplished by pulling on the handle 724. In the absence of shoulders 740, the pulling force exerted on the handle 724 in some circumstances can cause the arms 726 to flex outward a sufficient distance such that one or both of shell post holes 734 (FIG. 7C) clears and disengages from shell posts 720. In this and other examples, however, when the bail 710 is in the unlatched position shown in FIG. 7B, if the arms 726 begin to flex outwards, the shoulders 740 engage the cutouts 742 of bottom shell 706 to substantially prevent the arms 726 from flexing further, thereby substantially preventing or reducing the likelihood of the shell post holes 734 disengaging from the shell posts 720 when a force is applied to the handle 724.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A bail release mechanism comprising:

a bail configured to be attached to a shell of a module, the module including a latch pin configured to engage a structure of a receptacle in a host device in which the module is inserted to secure the module within the receptacle, the bail further configured to rotate about a first axis between a latched position and an unlatched position, the first axis being in a fixed position relative to the shell; and a de-latching member attached to the bail at a second axis that is offset from the first axis, the de-latching member configured to rotate about the second axis, the second axis being movable relative to the shell, the de-latching member including a first end configured to displace the structure of the receptacle during rotation of the de-latching member to disengage the latch pin from the structure, wherein the de-latching member comprises:

a second end opposing the first end;

a plurality of coaxial posts configured to be inserted into corresponding holes in the bail, the corresponding holes in the bail defining the second axis; and a pivot bar defining a third axis offset from the first axis and the second axis, the de-latching member additionally configured to rotate about the third axis.

2. The bail release mechanism of claim 1, wherein the bail comprises:

a handle;

a pair of arms attached to the handle, the pair of arms defining a first pair of coaxial holes configured to receive corresponding posts of the shell, the first pair of coaxial holes defining the first axis;

a pair of bases connected to the pair of arms; and a pair of fingers connected to the pair of bases, the pair of fingers defining a second pair of coaxial holes configured to receive corresponding posts of the de-latching member, the second pair of coaxial holes defining the second axis.

3. The bail release mechanism of claim 2, wherein each base includes a shoulder, the shoulders being configured to engage the shell to substantially prevent the first pair of coaxial holes from disengaging from the corresponding posts of the shell when a force is applied to the handle.

4. The bail release mechanism of claim 1, wherein rotation of the bail about the first axis from the latched position to the unlatched position causes the de-latching member to rotate about the second axis such that the first end moves from a first position configured to not displace the structure of the receptacle to a second position configured to displace the structure of the receptacle.

5. The bail release mechanism of claim 1, wherein the bail defines a protrusion configured and arranged to releasably engage a recess defined in the shell.

6. The bail release mechanism of claim 1, wherein the bail defines a recess configured and arranged to releasably engage a protrusion defined in the shell.

7. The bail release mechanism of claim 1, wherein the bail comprises sheet metal.

8. A module comprising:

a shell including a latch pin configured to be engaged by a structure of a receptacle into which the module is configured to be removably inserted;

at least one printed circuit board at least partially positioned within the shell;

an optical subassembly electrically coupled to the printed circuit board; and a bail release mechanism including:

a bail configured to rotate about a first axis between a latched position and an unlatched position, the first axis being in a fixed position relative to the shell; and a de-latching member configured to disengage the structure from the latch pin, the de-latching member being attached to the bail at a second axis that is offset from the first axis and configured to rotate about the second axis, the second axis being movable relative to the shell, the de-latching member including a first end configured to displace the structure of the receptacle during rotation of the de-latching member to disengage the latch pin from the structure, wherein the de-latching member comprises:

a second end opposing the first end;

a plurality of coaxial posts configured to be inserted into corresponding holes in the bail, the corresponding holes in the bail defining the second axis; and a pivot bar defining a third axis offset from the first axis and the second axis, the de-latching member additionally configured to rotate about the third axis.

9. The module of claim 8, wherein the structure of the receptacle includes a resilient tongue defining a recess configured to receive the latch pin and wherein the rotation of the bail from the latched position to the unlatched position is configured to cause an end of the de-latching member to displace the resilient tongue such that it clears the latch pin.

10. The module of claim 9, wherein the shell defines a recess configured to receive the end of the de-latching member when the bail is in the latched position, the end of the de-latching member being substantially flush with the bottom surface of the shell when seated within the shell recess.

11. The module of claim 8, wherein the latch pin is disposed on an exterior of the shell and the optical subassembly includes a diplexer comprising an optical transmitter and an optical receiver, the diplexer being positioned within the interior of the shell proximate the latch pin on the exterior of the shell.

12. The module as recited in claim 8, further comprising a plurality of tabs formed in the shell, the bail being configured to engage rear surfaces of the tabs in the unlatched position.

13. The module as recited in claim 8, wherein the module is substantially compliant with the SFP MSA.

14. The module as recited in claim 8, wherein the module is substantially compliant with the SFP MSA except for a height of the latch pin, which is shorter than permitted by the SFP MSA.

15. The module as recited in claim 14, further comprising a recess formed in the shell to accommodate an end of the de-latching member, a depth of the recess being deeper than a thickness of the end of the de-latching member, wherein the recess has sufficient extra space with the end of the de-latching member received therein to further accommodate at least a portion of the structure, the structure being biased into the extra space.

16. A module comprising:

a shell configured to be removably received within a receptacle of a host device;

means for engaging a structure of the receptacle;

means for disengaging the means for engaging from the structure of the receptacle, the means for disengaging being configured to rotate about a first axis and a second axis that are movable relative to the shell; and means for actuating the means for disengaging, the means for actuating being configured to rotate about a third axis that is fixed relative to the module.

17. The module of claim 16, wherein the means for engaging comprises a latch pin formed in the shell.

18. The module of claim 16, wherein the means for disengaging comprises a de-latching member.

19. The module of claim 16, wherein the means for actuating comprises a bail.

* * * * *